United States Patent

[11] 3,617,020

[72] Inventors: Milton I. Gerstine, Ardentown, Del.; John E. Burkam, Media, Pa.
[21] Appl. No.: 43,271
[22] Filed: Apr. 27, 1970
[23] Division of Ser. No. 695,251, Jan. 2, 1968, Pat. No. 3,509,971.
[45] Patented: Nov. 2, 1971
[73] Assignee: The Boeing Company, Seattle, Wash.

[54] VIBRATION CONTROL SYSTEM
16 Claims, 12 Drawing Figs.

[52] U.S. Cl. .................................. 244/17.27, 416/31
[51] Int. Cl. ............................................. B64c 27/00
[50] Field of Search ........................... 244/17.27, 17.11; 248/358, 20; 416/145, 31

[56] References Cited

UNITED STATES PATENTS

| | | | |
|---|---|---|---|
| 3,219,120 | 11/1965 | Hooper | 244/17.11 X |
| 3,298,443 | 1/1967 | Burkam et al. | 244/17.11 X |

Primary Examiner—Milton Buchler
Assistant Examiner—Paul E. Sauberer
Attorneys—Robert J. McDonnell, Franklin J. Visek and Albert W. Hilburger

ABSTRACT: A vibration control system for balancing out fuselage vibrations in one or two directions in one plane, which vibrations are caused by the rotating wing of an aircraft; the vibration control system having a force-producing mechanism of at least two pairs of counterrotating weights driven by at least two AC asynchronous motors, with the motors being synchronously operated to revolve the weights at three times the angular velocity of the rotating wing by electronic motor control systems therefor. Each motor control system utilizes a common speed reference generator producing pulses having a given repetition rate and includes an electromagnetic pickoff for sensing the speed of the motor and producing pulses having a repetition rate which is a predetermined function of motor speed and equal to the given repetition rate of the speed reference generator when the weights are being rotated at three times the angular velocity of the rotating wing. Both pulse trains are fed to series-connected tunnel diodes forming a reversible register responsive to a difference in the number of the pulses received, the register having different operating potentials or states representative thereof for actuation of blocking oscillators when the register is in certain operative states. The oscillators then cause SCR switches to become actuated to couple the power supply to the motor for increasing the speed of the motor. When the register is in one of its inoperative states, the switches are not in their actuated condition and the motor is decoupled from the power supply, which causes the speed of the motor to decrease, the speed being further decreased by use of an eddy current brake. Another electromagnetic pickoff senses the position of the weight which gates a command signal from a vibration-sensing accelerometer, such signal being supplied to the register which responds thereto by shifting the state thereof to one or another operative state or to one or another inoperative state. Such a command signal either delays or speeds up the time when the switches would normally either couple or decouple the motor and power supply so as to either advance or retard the phase of the motor and ultimately cause a change in the angular position of the weight to appropriately oppose the vibrations on the fuselage.

PATENTED NOV 2 1971 3,617,020

VIBRATION CONTROL SYSTEM

This is a division of Application Ser. No. 695,251 filed Jan. 2, 1968, now U.S Pat. No. 3,509,971.

BACKGROUND OF THE INVENTION

This invention relates to control systems and, more particularly, to motor control systems and vibration control systems for rotary wing aircraft such as helicopters.

Vibration forces on the fuselage of a helicopter are transmitted thereto from the rotors. These vibrations present constant problems with the most significant and predominate forces occuring at frequencies of $n$, $2n$, $3n$, etc., times the frequency of rotation of the rotor, where $n$ is the number of rotor blades. Furthermore, it has been determined that the most objectionable vibration force transmitted to the fuselage from the rotor hub occurs at a frequency equal to the number of rotor blades times the rotor's rotational frequency.

The present invention is primarily directed to a vibration control system for substantially balancing or counteracting the vertical and lateral vibratory forces on the fuselage. This invention may be used to counteract only the vertical vibration fuselage forces when those forces in the other directions are not considered objectionable. Additionally, other vibration forces caused by the rotor, for example, in the longitudinal direction could be counteracted by the system of this invention by merely adjusting the placement of the invention about the lateral or vertical axes; however, such longitudinal forces are usually relatively small and, accordingly, have been neglected.

SUMMARY

This invention relates to a control system primarily for controlling the vibrations of a rotary wing aircraft, the system including in one of its aspects a force-producing mechanism for substantially balancing out vibrations in one direction on the aircraft caused primarily by the rotating wing means. The force-producing mechanism includes a first pair of rotatable weight means and a second pair of rotatable weight means with first asynchronous motor means rotating one of the weight means from each pair of weights in opposite directions at an average rotational angular velocity of the rotating wing means of the aircraft, and with second asynchronous motor means rotating the other of the weight means from each pair of weights in opposite directions at the same average rotational angular velocity. A source of electrical power for each of the motor means and means for coupling and decoupling the power source to each of the first and second motor means are provided, the latter means controlling the current of the motor means and the speed of each of the asynchronous motor means to maintain the weights at the average rotational velocity.

The control system also includes sensing means responsive to a change in amplitude or phase of the vibrations in the one direction caused by the rotating wing, the sensing means controlling the means for coupling and decoupling the power source to the first and second asynchronous motor means, thereby altering the speed of at least one of the motor means which alters the angular position of the weight means.

A speed reference generator for producing reference pulses having a first polarity and a given repetition rate is included in the control system in accord with another aspect of the invention. The means for coupling and decoupling has a pair of sensing means for sensing the speed of the respective motor means and producing motor pulses having a polarity opposite to the first polarity of the speed reference pulses and a repetition rate which is a predetermined function of the speed of each of the motor means. The means for coupling and decoupling further has a pair of reversible register means each receiving the reference pulses and respective motor pulses from the pair of sensing means, and each of the register means providing an output signal of a first characteristic when the number of the reference pulses exceeds the number of the motor pulses and of a second characteristic when the number of the motor pulses exceeds the number of the reference pulses. The means for coupling and decoupling also has a pair of gating means connected between the power supply and respective motor means, and each of the gating means is responsive to the output signal from respective register means of one characteristic to decouple the power supply from respective motor means and to couple the power supply to respective motor means in response to the output signal from respective register means of the other characteristic.

In another of the aspects of this invention, the vibration control system includes sensing means for sensing vibrations, a force-producing mechanism for creating forces to oppose the vibrations, and comparison means responsive to the sensing means and the force-porducing means and having an output signal indicative of the difference between the vibrations and forces. The force-producing mechanism is responsive to the output of the comparison means for adjusting the forces produced thereby to balance out the vibrations and includes a support shaft means, and first and second means mounted on the shaft means for free rotation with respect thereto. The force-producing mechanism further includes first and second drive means responsive to the output signal of the comparison means and connected respectively to the first and second means for drivingly rotating the same about the support shaft means and for controlling the speed of rotation thereof.

When the vibration control system, in another of its aspects, is used to balance out vibrations in two directions in one plane, the first and second asynchronous motor means each will include a pair of induction motors respectively rotating one of the weights. One pair of the motors will rotate two weights in a clockwise direction at the same average rotational angular velocity and another pair of motors will rotate two other weights in a counterclockwise direction at the same average rotational angular velocity. The means for sensing the vibrations in one plane and sensing the position of each weight includes a first means for sensing the vibrations on the aircraft in one direction in the plane and for producing a first output vibration signal in response thereto, second means for sensing the vibrations on the aircraft in another direction in the plane substantially perpendicular to the one direction and for producing a second output vibration signal in response thereto, and means for combining the first and second output signals and for producing a clockwise control signal and a counterclockwise control signal.

The means for sensing the vibrations in one plane and sensing the position of each weight further includes means for sensing the angular position of each weight and producing a weight signal in response thereto. Means are provided which are responsive to weight signals from clockwise rotating weights for gating the clockwise control signal to couple and decouple the first pair of motors to the power source and controlling the current flow of the motor means and the speed of the motors, thereby altering the angular positions of clockwise rotating weights. Means are also provided which are responsive to weight signals from the counterclockwise rotating weights for gating the counterclockwise control signal to couple and decouple the second pair of motors to the power source.

The use of the AC asynchronous induction motors operated in a synchronous manner to rotate the weights of the present invention provides many advantages, among which are the elimination of the normal complex gear trains to produce the appropriate angular velocity of the rotating weights equal to a constant ratio of the angular velocity of the rotating wing means, particularly when the power source for synchronous motors would normally be at the alternator frequency of the aircraft. Also, the commanding of synchronous motors to advance and retard phase so as to shift the angular positions of the weights would also present problems which are not encountered by the use of the AC asynchronous induction motors, as described herein. Other advantages of using the induction motors over synchronous motors would be that they are more efficient, less weight to power ratio, and no special starting torque problems.

A general object of this invention is to provide a vibration control system which effectively balances or counteracts the vibration forces in the vertical and/or lateral directions imposed on the fuselage by the rotating wing of an aircraft.

A particular object is the provision of a vibration control system which compensates for changes in amplitude or phase of vibratory rotor forces.

A specific object is to provide a vibration control system for an aircraft which balances out vibratory rotor forces in an effective, accurate and reliable manner, yet with a minimum of complex circuitry, weight, and expense.

Another object is the provision of a control system for synchronous operation of an asynchronous motor.

A further object is to provide a control system for synchronous operation of asynchronous motors which rotate vibration balancing weights of a vibration control system at an average angular velocity.

BRIEF DESCRIPTION OF DRAWINGS

The novel features which are believed to be characteristic of this invention are set forth with particularity in the appended claims. The invention itself, however, both as to its organization and method of operation together with further objects and advantages thereof, may best be understood by reference to the following description taken in connection with the accompanying drawings, in which:

DESCRIPTION OF THE PREFERRED EMBODIMENTS

Figure 1:
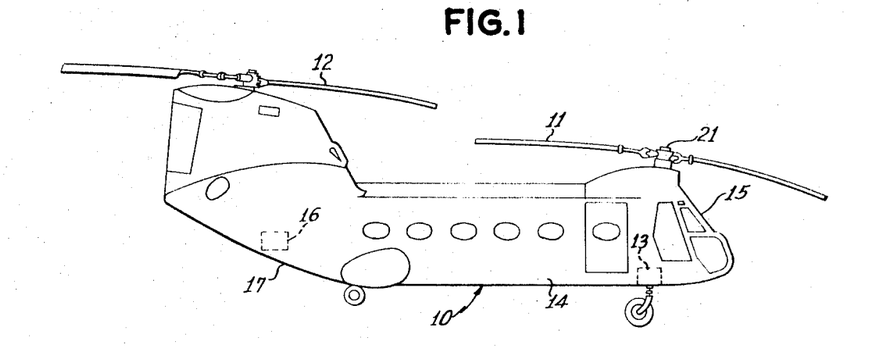
FIG. 1 is a side elevational view of a helicopter with vibration control systems in accord with this invention being shown by broken lines.
Figures 2, 4:
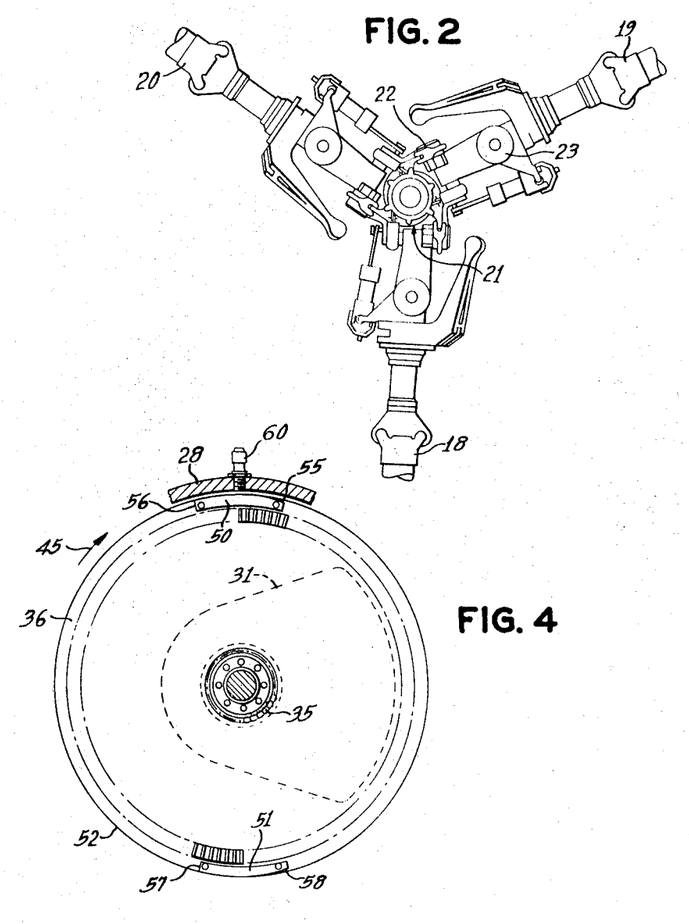
FIG. 2 is a top plan view of the forward set of rotor blades of the helicopter of FIG. 1.
FIG. 4 is a sectional view, taken substantially along lines 4—4 of FIG. 3.

Referring now more particularly to the drawings of FIGS. 1 and 2, the rotary wing aircraft or helicopter 10 is depicted as having a forward set 11 of rotor blades and a rearward or aft set 12 of rotor blades. A vibration control system 13 is disposed adjacent the forward set 11 of rotor blades for balancing out the fuselage vibration forces adjacent the cockpit 15, and another vibration control system 16 is disposed adjacent the aft set 12 of rotor blades for balancing out the fuselage vibration forces adjacent the cabin 17, hereinafter more fully described. The cockpit vibrations are closely related to and are primarily a function of the rotor forces of the forward set 11 of rotor blades, while the cabin vibrations primarily result from the rotor forces of the aft set 12 of rotor blades.

The forward set 11 of rotor blades comprises three rotor blades 18, 19, and 20 disposed substantially symmetrically with respect to each other about and connected to rotor hub 21 which drives the rotor blades. Each of the rotor blades 18, 19, and 20 is movable in a vertical plane about a flap hinge 22 and in a horizontal plane about a lead-lag hinge 23. The aft set 12 of rotor blades is, in general, similar to the forward set 11 of rotor blades, which is common in the art. While the helicopter depicted in FIG. 1 shows the two sets of rotor blades in tandem, it is to be understood that some helicopters employ a dual set of rotor blades coaxially disposed on one rotor hub while other helicopters employ a single set of rotor blades. Furthermore, it is evident that the blades could be rigid with the rotor hub or movable about a single articulated joint rather than being movable in the vertical and horizontal planes previously described. While the number of rotor blades in each set has shown as comprising three radial members, other suitable numbers of blades could be provided on each hub.

Figure 3:
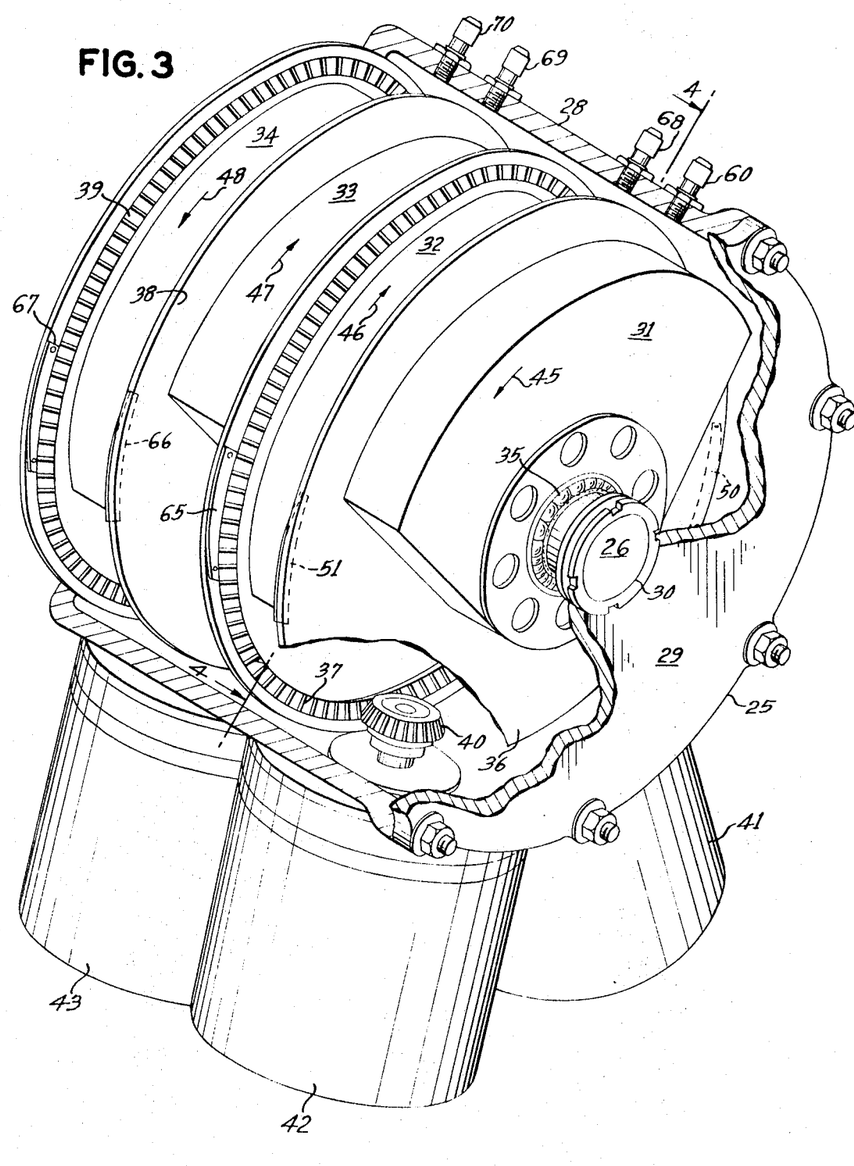
FIG. 3 is a pictorial illustration of the force balancer employed in a vibration control system in accord with the invention, with portions being removed for clarity.

A force balancer 25 to be employed in the vibration control system 13 of FIG. 1 is depicted in FIG. 3 which is rigidly mounted to the helicopter. The balancer may be placed in or adjacent the cockpit 15 with the elongated shaft 26 being horizontally disposed and in parallel position with the longitudinal axis of the helicopter when vibrations along either or both of the vertical or lateral axes are to be counteracted. Force balancer 25 comprises a housing 28 having opposed end portions, including portion 29, with the shaft ends, including end 30, of shaft 26 being respectively connected to the end portions of housing 28. A plurality of weight members 31, 32, 33, and 34 are freely rotatably mounted on shaft 26 be bearings, including bearing 35, with each of the members 31, 32, 33, and 34 being driven by respective ring gears 36, 37, 38, and 39 which are driven by respective pinions, including pinion 40, drivingly connected to respective motors, including motors 41, 42, and 43.

For purposes of identification, motor 41 drives a pinion (not shown) which drives ring gear 36, ring gear 36 causing rotation of weight member 31 in the direction of counterclockwise arrow 45 (see FIG. 3). Motor 42 drives ring gear 37 through pinion 40 to rotate weight member 32 in the direction of clockwise arrow 46. Motor 43 drives ring gear 38 and its attached weight member 33 in the direction of clockwise arrow 47, while another motor (not shown) IN FIG. 3 but designated 44 in FIG. 5B) drives ring gear 39 which rotates weight member 34 in the direction of counterclockwise arrow 48. The pair of weight members 31 and 33 is shown as having the same configuration and weight, and the pair of weight members 32 and 34 also is shown as having the same configuration and weight. However, the weight of members 31, 33 may be different than the weight of the pair of members 32, 34. That is, it is intended that the vibration force to be cancelled by rotating weights 32 and 34 is larger than the vibration force to be cancelled by weights 31 and 33. However, it should be understood that each of the arcuate members 31, 32, 33, and 34 may, if desired, be constructed to have the same weight, particularly when the force balancer is employed as a one-axis system, as described hereinafter. It is also to be understood that the weights 31 and 33, and 32 and 34 may each be different but that the mass moment of weights 31 and 33 should be substantially identical and the mass moment of weights 32 and 34 should likewise be identical. However, as discussed above, the mass moment of all the weights could, if desired, be identical or the mass moment of weights 32 and 34 could be larger than the mass moment of weights 31 and 33 for cancelling a larger vibrational force.

With the shaft 26 parallel, for example, to the longitudinal axis of the helicopter and in a horizontal position, the force balancer 25 is disposed to substantially balance out the vibration-causing forces on the fuselage imposed by the rotor forces in the vertical-lateral plane of the forward set 11 of rotor blades. If the force balancer 25 were being used to cancel out the vibrations in a single direction, for example, the vertical direction, slight modifications of the force balancer 25 would be desirable. These modifications would include the elimination of two of the motor mechanism, for example, motors 41 and the motor (not shown in FIG. 3 but designated 44 in FIG. 5B) and the pinions associated with the eliminated motor mechanisms. The relative spacing between ring gear 36, with its weight member 31 attached, and ring gear 37, with its weight member 32 attached, would be altered so that gear 36 also meshes with pinion 40 of motor 42, which would not only drive weight member 32 in the direction of arrow 46, but would then drive weight member 31 in the direction of arrow 45 (see FIG. 3). Similarly, ring gears 38 and 39 would be driven by the pinion (not shown in FIG. 3 but designated 75 in FIG. 5B) of motor 43 with weight members 33 and 34 being rotated in the direction of their respective arrows 47 and 48. The electromagnetic pickoffs 60 and 69 would be removed and the openings in housing 28, remaining after removal of two motors, including motor 41, would be suitably plugged.

Figure 5A:
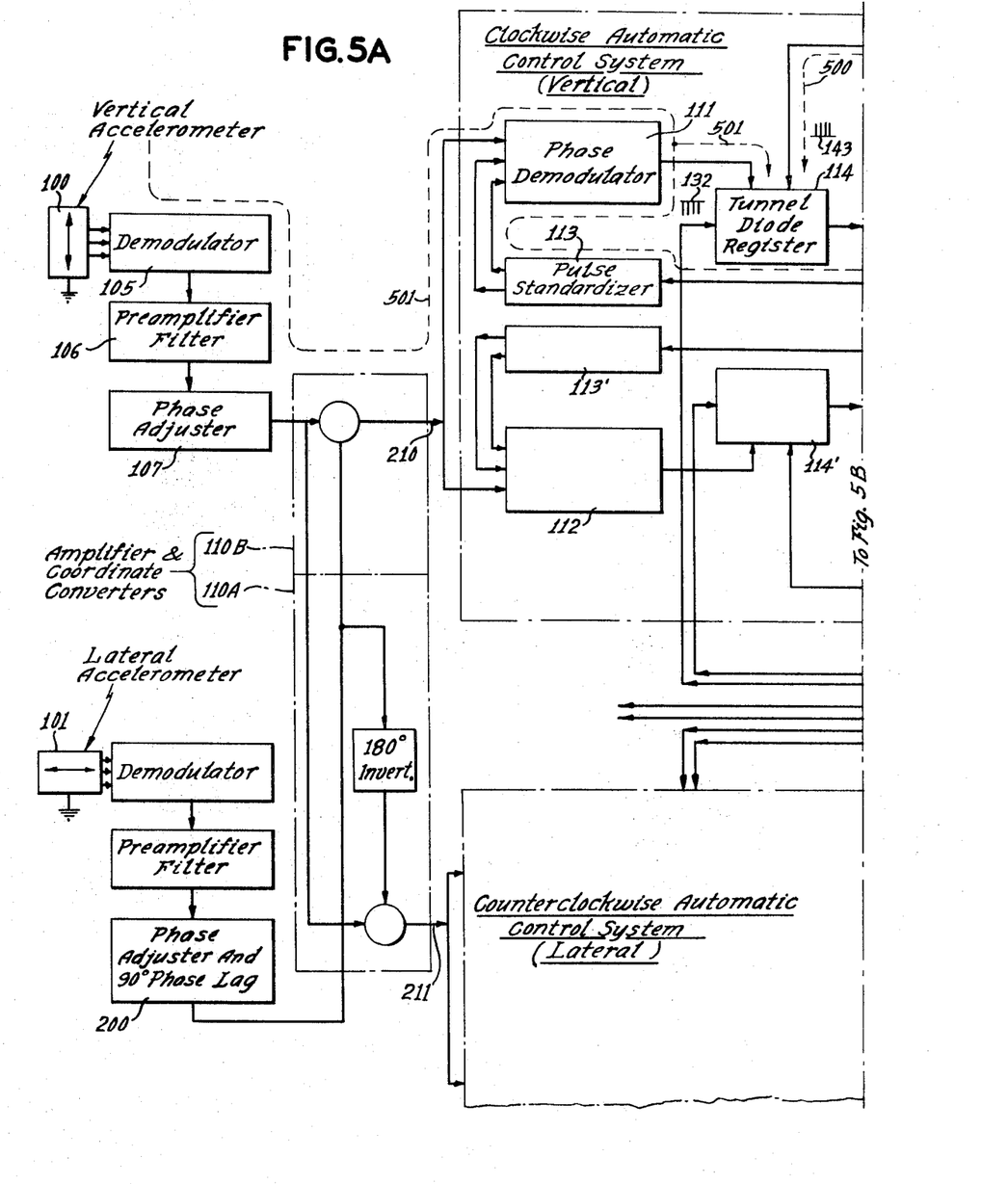
FIGS. 5A and 5B are a schematic block diagram of a vibration control system.
Figure 5B:
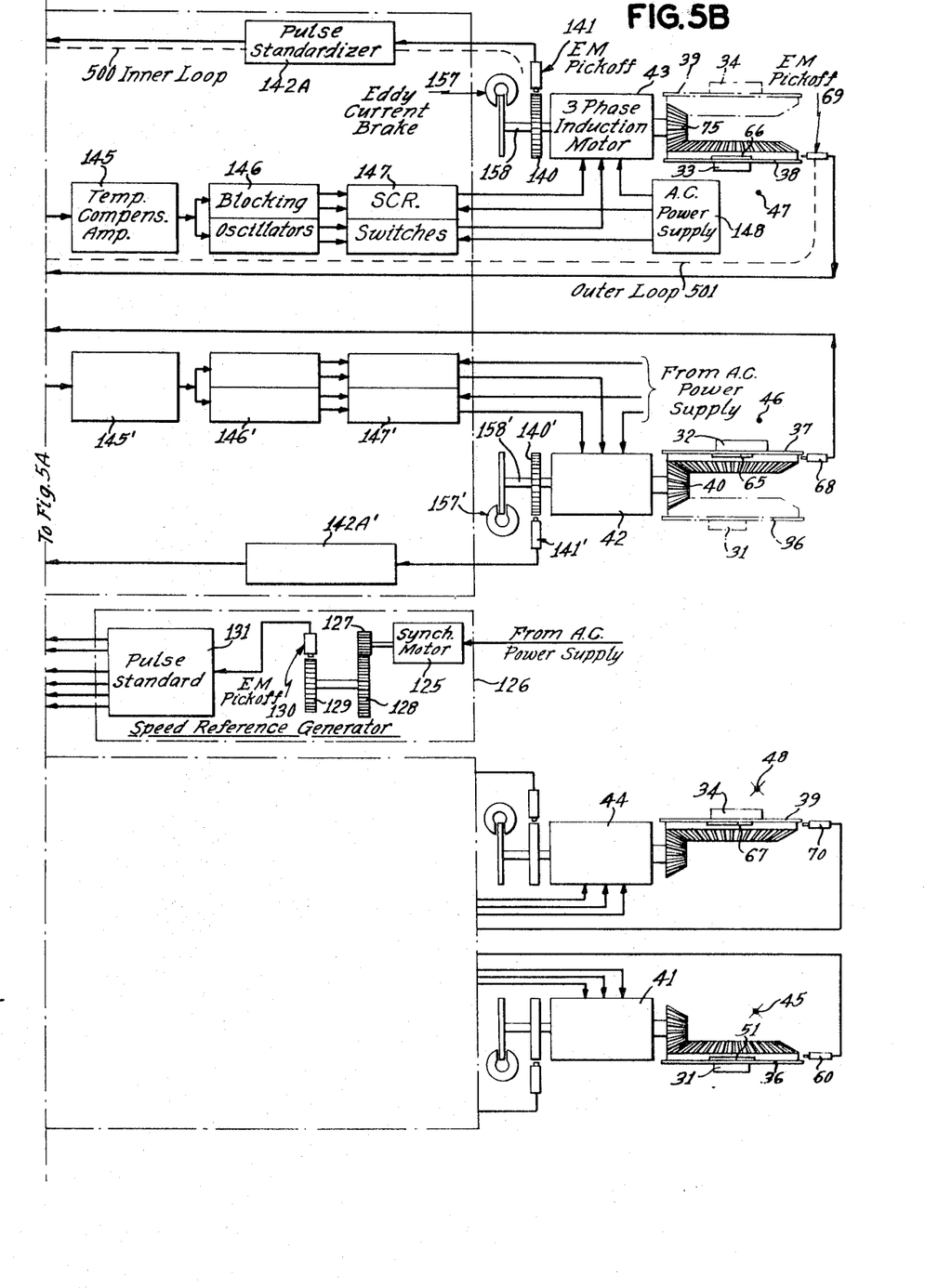

For the purpose of describing the single-axis control system, the upper channel in FIGS. 5A and 5B, which is termed a clockwise automatic control system, is more accurately identified with respect to an axis of linear motion. Since the exemplary axis chosen above to describe the single-axis system is the vertical axis, the same may Gulton termed a vertical automatic control 175–However, when both channels are to be employed in a multiaxis system, it is considered more accurate to term the upper and lower channels of FIGS. 5A and 5B, respectively, as clockwise and counterclockwise automatic control systems. It is in this manner that the description set forth hereinafter will treat the automatic control systems of FIG. 5A and 5B. However, it should be appreciated that the axis to be chosen for vibration balancing could be varied by one skilled in the art. Additionally, it can be readily understood that a single-axis control system as depicted in the upper channel of FIGS. 5A and 5B, would not require the coordinate converter components 110A or 110B (hereinafter more fully described) of the channel depicted as the lower channel or the upper channel (respectively designated as the clockwise and counterclockwise automatic control systems) in FIGS. 5A and 5B.

In FIG. 4, ring gear 36 is depicted as having the weight member 31 mounted thereon for rotation therewith. A pair of magnetic inserts 50 and 51 are connected to ring gear 36 adjacent the outer circumference 52 thereof. Insert 50 includes a sloping leading edge portion 55 and a sharp lagging or trailing edge portion 56 which will produce a sharp pulse of current in electromagnetic pickoff 60 as the ring gear 36 rotates in the direction of arrow 45, arrow 45 being seen as clockwise as viewed from the side thereof shown in FIG. 4 and counterclockwise as seen in FIG. 3. Insert 51 includes a sharp leading edge portion 57 and a sloping trailing edge portion 58 which, upon further rotation of ring gear 45, will produce a pulse of current having opposite polarity from the current pulse produced from the insert 50 of the electromagnetic pickoff 60. The sharp edges 56 and 57 of inserts 50 and 51, respectively, are diametrically opposite each other and spaced from respective sides of the weight member 31. The current pulses produced and functions thereof will be more fully described in connection with the operation of the control system and circuits hereinafter.

Ring gear 37 is provided with diametrically opposed magnetic inserts, including insert 65, which are substantially identical with inserts 50 and 51. Similarly, each of ring gears 38 and 39 are provided with identical diametrically opposed magnetic inserts 66 and 67. Electromagnetic pickoffs 68, 69, and 70 are adjustably mounted in housing 28 in alignment and for cooperation with respective magnetic inserts attached to respective ring gears 37, 38, and 39.

The rotary wing aircraft vibration control system is shown by the diagrams of FIGS. 5A and 5B, such system comprising a vertical accelerometer 100 and a lateral accelerometer 101 with their respective sensing axis positioned in the vertical and lateral directions in the vertical-lateral plane to indirectly sense all forces in the respective vertical and lateral directions applied to the rotor hub by the rotor blades. Accelerometers 100 and 101 may be of the type sold by the Gulton Industries as Part Number A175-2SP. These accelerometers, if desired, may be suitably attached to the helicopter on a portion of the rotor structure, cockpit floor, or near the top of the nonrotating pylon, so long as the acceleration sensed by each accelerometer includes no more than a small amount of acceleration from any other balancer in the aircraft, but each accelerometer does sense the acceleration induced by its associated balancers. The accelerometer 100 senses the timing of the passage of the vector sum of all of the accelerations due to the vibration forces adjacent the rotor hub 21 in the vertical direction in the vertical-lateral plane.

The output signal from the vertical accelerometer 100 is connected to a demodulator 105 for detecting the amplitude of the signal received from the accelerometer 100 which is then amplified and filtered by preamplifier and filter 106. The signal is then passed through a phase adjuster 107 to shift the phase of the signal to compensate for the phase lag between the equivalent external force required to be created by the force balancer 25 and the vertical vibration motion sensed by the accelerometer 100. The phase lag is a complicated function of the stiffness and mass of the structure at or near the force balancer location and between the force balancer and the accelerometer. Therefore, the appropriate adjustments to be made in the phase adjuster 107 could be determined by an analysis of each installation in each aircraft. Normally, however, adjustment would be made on the initial installation. This would be accomplished by adjusting phase adjuster 107 so that it cancels out the phase shift due to structural compliance of the helicopter and so that the phase of the voltage entering the phase demodulator 111, with respect to the phase of the weight, which it controls, is the same for all installations. That is, the resistor 340 in the phase adjuster 107 (see FIG. 6) would be adjusted so that the waveforms on an oscilloscope attached to point A of the phase demodulator 111 (see FIG. 7) would show the weight position pulse occurring at the crest of the acceleration waveform. Under this condition, only the associated weight is driven with the aircraft at rest, by artificially driving the associated motor. For the two-axis system, adjustment would be achieved in the same manner as above except that each of the phase adjusters 107 and 200 would be concurrently adjusted in the initial installation to maximize the accelerometer signal in addition to centering the weight position pulse at the crest of the acceleration signal.

Considering a single-axis vibration control system, which may be appropriate for use as the aft control system 16 because both the lateral and longitudinal vibrations in the cabin 17 are relatively small and may be neglected, the ring gears 39 and 36 (shown by broken lines in FIG. 5B) would be in mesh with respective pinions 75 and 40, which normally drive ring gears 38 and 37, pinions 75 and 40 being driven by respective motors 43 and 42. When the vibration control system is employed to balance only the vertical vibrations or the vibrations in any one direction, the amplifier and coordinate converter 110A may be disregarded and the output from the phase adjuster 107 is fed directly into the phase demodulators 111 and 112. Also, the lateral accelerometer 101 and remaining components associated therewith may be disregarded, since these are used in the two-axis vibration control system considered after a discussion of a single-axis system.

The output of the phase demodulator 111, as it appears at A, is the filtered accelerometer signal 365 chopped by switch 375 in response to square wave 372. The voltage at A will be either zero when the switch 375 is closed or will be the slowly varying accelerometer signal when the switch is open. There will be two sudden changes in the voltage at A, one at the instant the switch opens, the other at the instant it closes. The direction of change will be of the same polarity as the accelerometer signal at the instant the switch opens and will be of opposite polarity at the instant it closes. Capacitors 380 and 392 differentiate the signal at A to produce either positive or negative pulses to command register 114. For a given alternating accelerometer signal 365, the instantaneous voltage will have changed polarity between the time in which switch 375 opens and the time in which it closes. The sudden change will therefore be in the same direction and will produce at register 114 two pulses of the same polarity for each rotation of the weight 38.

The AC power supply connected to the synchronous motor 125 of speed reference generator 126 is generated by an alternator (not shown) suitably geared to the rotor shaft, whereby the speed of motor 125 is always exactly proportional to the rotor speed. Motor 125 drives gear 127 drivingly meshed with gear 128 which rotates a multitooth ferrous metal wheel or gear 129, having a predetermined number of teeth, to produce a train of pulses 132 in the electromagnetic pickoff 130 of a certain polarity which are standardized by pulse standardizer 131, and these pulses are supplied to the reversible register 114.

Since the weights of the force balancer 25 are to be rotated at three times rotor speed, the three-phase induction motor 43 rotating the weights 38 and 39 of the single-axis system is selected to rotate the weights and the multitoothed ferrous metal wheel 140 to produce a train of pulses 143 in the electromagnetic pickoff 141 of a certain polarity which are standardized by pulse standardizer 142A, and these pulses are supplied to the reversible register 114.

When the weights are being rotated at three times rotor speed, the pulses 143 and pulses 132 are produced in the respective pickoffs 141 and 130 at exactly the same frequency. The polarity of the pulses 132 from the speed reference generator 126 is opposite to those pulses 143 from pulse standardizer 142A. As will be best understood from FIG. 8, the polarity of the pulses 132 received by the register 114 from the generator 126 is negative while those pulses 143 are positive.

Figure 7:
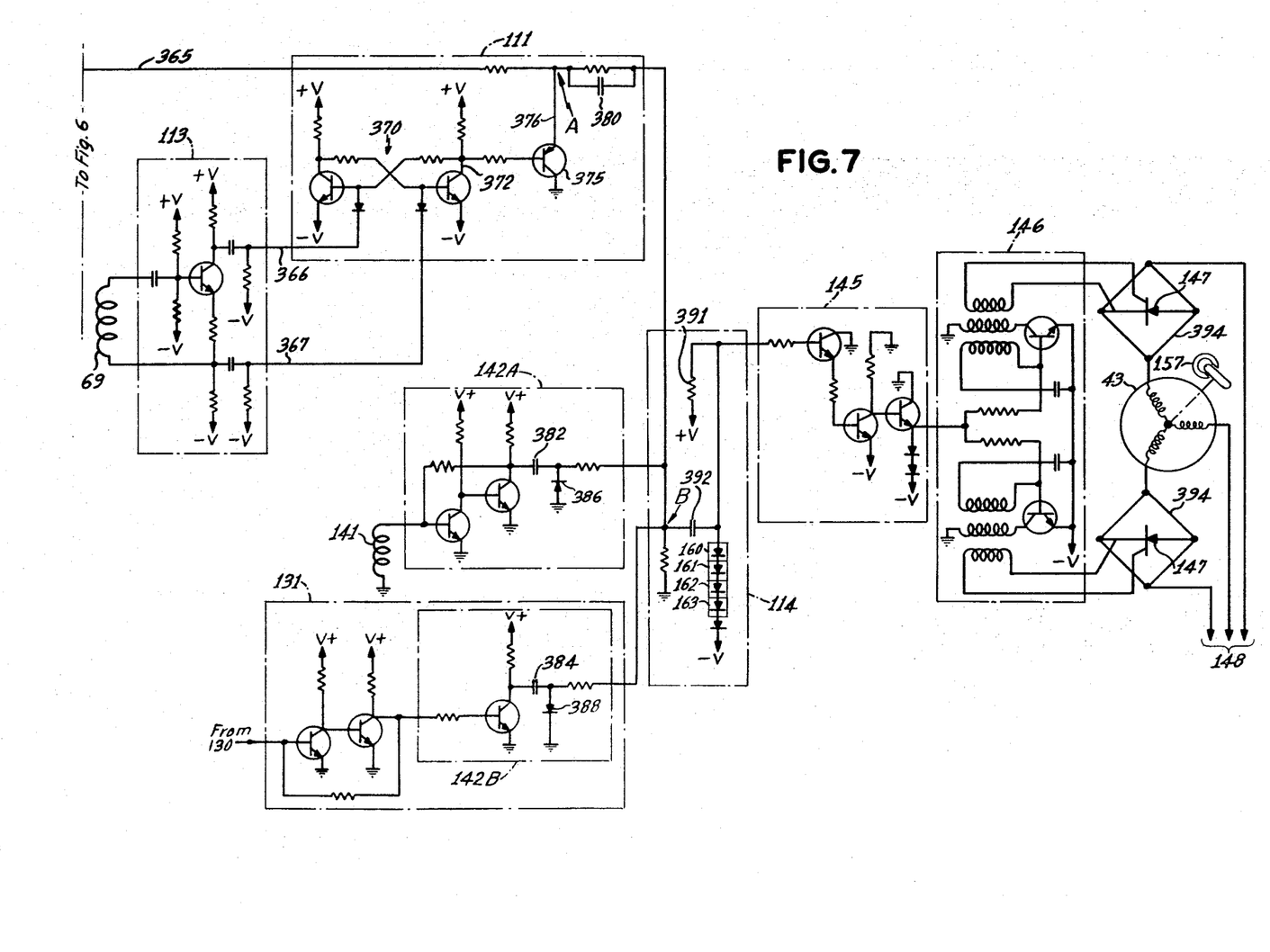

Both trains of pulses 132 and 143 feed into reversible register means 114 which essentially consists of a plurality of tunnel diodes connected in series with each other and a current source. Each tunnel diode has two different stable voltage values or states which may be changed by a pulse of input voltage of a predetermined value, for example, approximately 0.5 volts. These tunnel diodes may be of the same type as the industry standard, JETEC, Designation 1N3712. A plus pulse 143 from standardizer 142A will switch the register 114 up one state and a negative pulse 132 from generator 126 will switch the register 114 down one state. Four tunnel diodes 160, 161, 162, and 163 are connected in series, as seen in FIG. 7, to provide five different states, as will be hereinafter more fully explained.

The output of the register 114 is connected as an input to a temperature-compensating amplifier 145 which compensates for the ambient temperature changes in the helicopter and stabilizes the output voltage therefrom. Amplifier 145 also reverses the polarity of the input signal supplied from register 114. The inverted output from amplifier 145 is connected as a pair of inputs to a pair of blocking oscillators 146 which are normally biased below cutoff. At an input voltage approximately midway between states 2 and 3 of the tunnel diode register (assuming five states of the register), the oscillators 146 begin oscillating and trigger the conduction of a pair of silicon-controlled rectifier 147 functioning as switches between two of the three lines between the AC three-phase power supply 148 and the three-phase induction motor 43.

Figure 8:
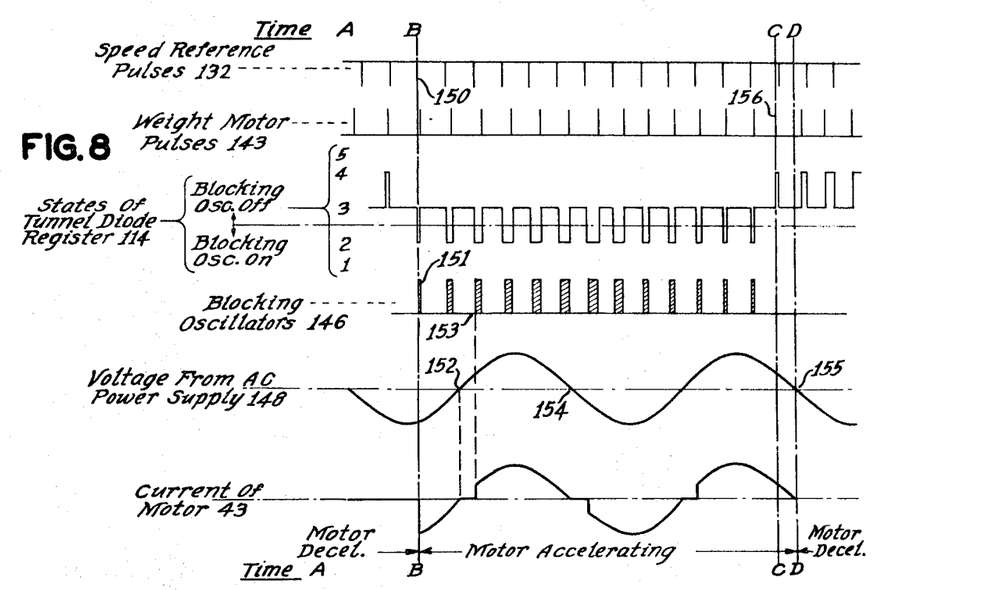
FIGS. 8 and 9 are waveform diagrams of certain signals and responses of the electrical components of the control system.

Considering the graph of FIG. 8, from time A to time B, the plus weight motor pulses 143 from motor 43 and standardizer 142A and the minus pulses 132 from the speed reference generator 126 alternatively change the state of the register 114 back and forth between states 3 and 4 above the cutoff of blocking oscillators 146. This renders the oscillators 146 and the SCR switches 147 off with no current being passed from supply 148 to motor 43.

At time B, the motor 43 has decelerated sufficiently so that the plus pulses 143 become farther apart or the frequency thereof has decreased sufficiently to permit an extra negative pulse 150 from pulse train 132 of speed reference generator 126. This shifts the state of the register 114 down to state 2, thereby turning on the blocking oscillators 146 which fire the SCR switches 147 and connect power from supply 148 to motor 43. The blocking oscillators 146 are actuated and the pulses 151 from blocking oscillators 146 fire the SCR switches 147. These SCR switches 147 continue to conduct regardless of the voltage applied to their control inputs from blocking oscillators 146 until the anode to cathode voltage from the AC power supply 148 is zero which will occur at the end of each half cycle of alternating current. Therefore, when the first pulse from blocking oscillators 146 fires the SCR switches 147, the motor 43 is supplied with AC three-phase power from supply 148. The SCR's continue to connect the AC power supply 148 to motor 43 until the voltage is zero at 152, even though the blocking oscillators 146 are not on during that portion of the AC power cycle. The current through motor 43 is interrupted between the time when the voltage is zero at 152 until the blocking oscillators 146 are again conducting at 153. Thus, the SCR's fire again, and the current is supplied to motor 43 until the voltage again is zero at 154.

Without the current flowing to motor 43, the motor is decelerating between times A and B. When the motor 43 is supplied with the AC voltage from power supply 148 at point B, current is passing through the motor and the motor is accelerating until time D. However, at time C, the motor 43 has accelerated sufficiently so that its speed and the weight motor pulses 143 exceed, as at 156, the speed reference pulses 132. That is, the plus pulses 143 supplied to register 114 again outnumber the minus pulses 132 supplied from the speed reference generator 126 by one. This shifts the register 114 up to states 3 and 4 which raises the voltage supplied to the blocking oscillators 146 above cutoff. Since the SCR switches 147 were in their fired condition, the voltage supplied from 148 to motor 43 continues after time C to time D where the voltage from supply 148 is zero, as at 155, whereupon the motor decelerates from time D and thereafter.

A suitable eddy current brake 157 (see FIG. 5B) is cooperatively disposed on shaft 158 of induction motor 43 and supplies opposing torque and prevents freewheeling of the weights 38 and 39 of the force balancer 25. Brake 157 thus assists friction and windage to decelerate the motor 43 when the power to the motor is temporarily decoupled. While the eddy current brake 157 is shown as being full time on, i.e., supplying opposing torque at all times even during the time when power is being supplied to the motor, it is to be understood that an intermittent eddy current brake might have been employed, if desired. In such a case, the brake would not be on or opposing the rotation during the time when power is supplied to the motor.

Figure 9:
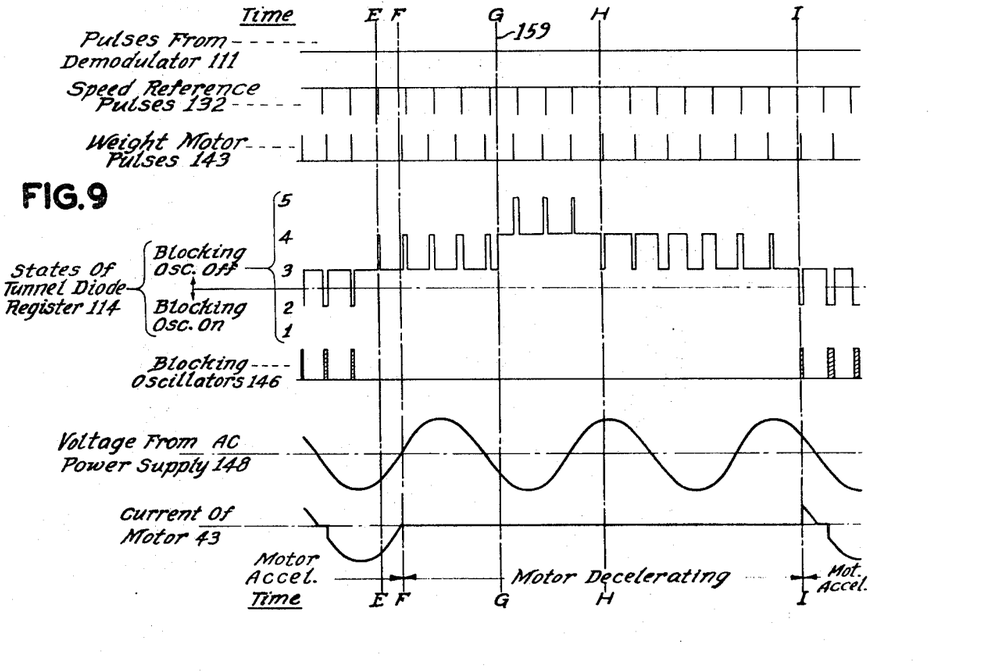

The graph of FIG. 9 depicts the functioning of the vibration control system 13. Illustrated are the speed reference pulses 132 and weight motor pulses 143 being applied to register 114, as also graphically shown in FIG. 8. But FIG. 9 also includes pulses 159 from the demodulator 111 which will either move the register 114 up or down, depending on the polarity of the pulses, but only if such pulses exceed the amplitude threshhold, i.e., 0.5 volts, necessary to command the register 114. Before time E, motor 43 is on and accelerating, and at point E, the weight motor pulses 143 overtake the speed reference pulses 132. Thus, the tunnel diode register 114 shifts up to states 3 and 4 above cutoff of the blocking oscillators 146, as previously described in connection with FIG. 8, particularly with respect to times C and D. Since the SCR switches 147 are conducting until the voltage from supply 148 becomes zero, motor 43 continues to accelerate to time F. At time G, a pulse of sufficient amplitude 159 appears at the output of demodulator 111 and this positive pulse 159 shifts the register 114 up to states 4 and 5, thereby storing this information in register 114 until time H. Between times F, G, and H, motor 43 continues to decelerate and the weight motor pulses 143 occur less frequently. At time H, the positive motor pulses 143 again fall one pulse behind the negative speed reference generator pulses 132, thereby shifting the register back to states 3 and 4. The motor 43 continued to decelerate, and if no more positive pulses 159 have come into register 114, the negative speed reference pulses 132 again overtake the positive motor pulses 132 at time I, and this negative pulse shifts the register 114 to states 2 and 3. The blocking oscillators 146 are then actuated and fire the SCR switches 147 to connect the power supply 148 to motor 43, thereby accelerating motor 43.

If the demodulator 111 had sent a negative pulse to the register 114 at time G, the register 114 would have shifted from states 3 and 4 to states 2 and 3 to actuate the blocking oscillators 146 and fire the SCR switches 147 to connect the power supply 148 to motor 43. If the demodulator 111 had sent negative pulses after time I, the register 114 would have been shifted down one state from states 2 and 3 to states 1 and 2 for storage thereof, such pulse not causing any change in the acceleration of motor 43. If the register 114 is either in state 1 and 2, or 4 and 5, other pulses 159 received from the demodulator 111 or speed reference pulses 132, or weight motor pulses 143 tend to drive the register 114 farther than these end states; those pulses are not stored in register 114.

It can thus be seen that the operation of the induction motor 43 which drives weights 33 and 34 of the force balancer 25 in a one-axis system, is governed by a two-loop servo means. One loop of the servo means is designated 500 (see FIG. 5A) and functions as an inner speed loop, primarily providing electrical synchronization of the weight speed with three times rotor speed. The inner loop 500 comprises the electromagnetic pickoff 141, in which pulses 143 are created by rotation of motor 43, shaft 158 and toothed wheel 140, and pulse standardizer 142A. The tunnel diode register 114, temperature-compensating amplifier 145, blocking oscillators 146, and SCR switches 147 are all common to the inner loop 500 and the outer loop 501 of the servo means.

Loop 501 functions as an outer or vibration-nulling loop which senses the structural responses to the combination of the external rotor forces and the internal forces of the force balancer 25. Loop 501 commands the appropriate changes in the phase of motor 43 to null or balance out the structural motion caused by such a combination of forces. In addition to the electromagnetic pickoff 69, in which pulses are created by rotation of ring gear 38 and weight 33, the outer loop 501 comprises the pulse standardizer 113, vertical accelerometer 100, demodulator 105, preamplifier filter 106, phase adjuster 107, and phase demodulator 111. As set forth above, with the other components such as the tunnel diode register 114, temperature-compensating amplifier 145, blocking oscillators 146, and SCR power amplifiers 147 are common to both loops.

When there is no vibration error signal produced by the outer loop 501, the inner loop 500 will maintain weights 33 and 34 at a given average phase relationship with respect to the rotor blades. The phase of the motor 43 and phase of the weights 33 and 34 are shifted by vibration error signals being applied to the register 114 from outer loop 501; the register 114 in turn controls the supply of power to motor 43.

The accelerometer signal from phase adjuster 107 is not only connected as an input to phase demodulator 11 but also to demodulator 112 which may be exactly identical to phase demodulator 111. The other components, i.e., tunnel diode register 114', compensating amplifier 145°, blocking oscillators 146', SCR power amplifiers 147°, pulse standardizer 113', pulse standardizer 142A', electromagnetic pickoff 141', ferrous toothed wheel 140', and eddy current brake 157' for controlling the three-phase induction motor 42 which rotates weights 31 and 32, may be the exact equivalent of the components previously described in connection with the control of motor 43.

In general, the vertical accelerometer 100, demodulator 105, preamplifier filter 106, and phase adjuster 107 in a single-axis force balancer system constitute a means for sensing the vibrations while the components identified as the clockwise automatic control system in FIGS. 5A and 5B may be considered to broadly be a comparison means responsive to both of the means for sensing and the force-producing mechanism 25 through pickoffs 69 and 68 for providing output signals indicative of the difference between the vibrations and the forces produced by the weights 33 and 34, and 32 and 31. These comparison output signals thereafter appropriately control the drive motors 43 and 42 for respective weights 33 and 34, and 32 and 31 to adjust the forces produced thereby to balance out the vibrations.

The weights 31, 32, 33 and 34 are initially assembled so that centrifugal forces of each pair add at the top and bottom of the circular path, i.e., at 12 and 6 o'clock. In a single-axis force balancer, it is preferable to have all the weights 31, 32, 33, and 34 of the same configuration and weight. In this manner, the counterrotation of weights 33 and 34 by motor 43 and the counterrotation of weights 31 and 32 by motor 42 enables the lateral of horizontal forces created by each weight of a pair of weights to cancel each other. The two pairs of weights may be controlled to cancel each other by weights 31 and 32 being at 12 o'clock at the instant when weights 33 and 34 are at 6 o'clock, or add with all weights being at 12 o'clock or 6 o'clock at a particular instant. At other positions, the resultant force will be the vector sum of the individual forces of the weight pairs. The resultant force created by the force balancer 25 may thus be controlled in amplitude by momentarily changing the speed of rotation of one motor relative to the other, thereby altering the angular position of a pair of weights relative to the other. This balancer force which the balancer 25 creates must be directly opposite to the motion-causing vibration force imposed on the fuselage by the rotor. Accordingly, the phasing of the balancer force is controlled or effected by speeding up or slowing down both motors simultaneously. This alters the angular position of each pair of weights and tends to move the resultant balancer force to a position directly opposing the vibrational force.

In order that both the vertical and lateral vibrations be counteracted by balancer 25, each of the weights 33, 32, 34, and 31 is driven by respective controlled motors, 43, 42, 44, and 41, as shown in FIGS. 5A and 5B, rotating about a common longitudinal axis.

The vibration forces created in the vertical-lateral plane by the rotor blades will cause motion in that plane which will generate an elliptical locus with such locus rotating in either direction. The two-axis force balancer 25 creates a pair of counterrotating force vectors each being the sum of vertical and lateral centrifugal force components from a pair of weights rotating in the same direction. These counterrotating force vectors create a resultant vector sum directly opposite to the vector sum of the vertical and lateral vibrational forces imposed by the rotor blades and substantially balance or cancel such vibrational forces.

As discussed above, the automatic control system for a single-axis system of cancelling or balancing out the vertical vibration forces has been designated in FIGS. 5A and 5B as being the vertical automatic control system for motors 42 and 43. However, in a two-axis force balancer system, the automatic control system for motors 42 and 43 should be designated as a clockwise automatic control system and the other automatic control system as a counterclockwise automatic control system, hereinafter more fully explained. Since the counterclockwise control system is the same as the clockwise control system, only the clockwise control system is described in detail herein. However, the interconnecting components of the coordinate converters 110A and 110B are hereinafter described with respect to FIGS. 6 and 6A.

The coordinate converters 110B and 110A mix the vertical and lateral accelerometer signals in a manner to permit the automatic control systems to create accelerometer signals which may be designated counterclockwise for the counterclockwise-rotating weights 31 and 34, and clockwise for the clockwise-rotating weights 32 and 33. That is, coordinate converter 110B sums the outputs of phase adjusters 107 and 200 to obtain a clockwise function from a linear function (from linear to rotational coordinate). Additionally, coordinate converter 110A subtracts the phase adjuster inputs to achieve a counterclockwise function. These clockwise directions are shown by the arrowheads 47 and 46, and the counterclockwise directions are shown by arrow fins 48 and 45 in FIG. 5B. These counterclockwise and clockwise signals from the converters 110A and 110B, respectively, control the suitable weights of balancer 25 to create a counterclockwise force vector and a clockwise force vector which can together reproduce and cancel the vertical and lateral vibration forces imposed by the rotor blades. The coordinate converters 110B and 110A combine the two accelerometer signals and convert them into two counterrotating components, a clockwise component from 110B and a counterclockwise component from 110A.

As set forth above, the lateral accelerometer signal is lagged in phase by 90° in the phase adjuster 200 and added to the vertical accelerometer signal to obtain twice the vertical component of the counterclockwise acceleration vector. The lateral accelerometer signal which has been lagged by 90° is subtracted from the vertical accelerometer signal to obtain twice the vertical component of the clockwise acceleration vector. Electrically, this subtraction occurs by reversing the polarity of the lagged lateral accelerometer signal and adding some to the vertical accelerometer signal.

The clockwise signal 210 from the coordinate converter 110B is fed into each of the phase demodulators 111 and 112 which independently control the respective clockwise rotation weights 33 and 32. The counterclockwise signal 211 is fed into two phase demodulators (not shown) in the counterclockwise automatic control system for controlling the respective counterclockwise rotation of weights 34 and 31.

The phase of the clockwise signal 210 is compared in each of phase demodulators 111 and 112 with the position of each of the respective weights 33 and 32. If the weight vector leads the resultant vector sums, which represents the total of all forces on the fuselage which produce accelerometer (i.e., the resultant of the external forces causing cockpit motion by the rotor and the weight vectors of the rotating weights 33 and 32), negative pulses will be produced which are fed into the registers 114 and 114'. If the weight vector lags the resultant vector sum, positive pulses will be produced and fed into registers 114 and 114'.

As previously indicated, negative pulses, upon occurrence of weight pulses through standardizers 113 and 113', are supplied to the tunnel diode registers 114 and 114'. These negative pulses will cause the registers to shift down one state from states 3 and 4 (assuming the registers are not in states 4 and 5 to states 2 and 3, thereby actuating the blocking oscillators 146 and 146', firing the SCR switches 147 and 147' and connecting power supply 148 to each of motors 43 and 42 to accelerate same. Since the motors 43 and 42 are accelerating, the weights 33 and 32 accelerate to change the angular position of the weights and the phase of the sum of the forces produced by weights 33 and 32. While it has been assumed that such negative pulses were passed to registers 114 and 114' simultaneously, such condition is not necessary. Nor does such simultaneous passage occur because such pulses from the phase demodulators 111 and 112 are passed to registers 114 and 114' upon appropriate weight position pulses from electromagnetic pickoffs 69 and 68 and these pulses may not be produced simultaneously.

As previously indicated, positive pulses, upon occurrence of weight pulses through standardizers 113 and 113', are supplied to the tunnel diode registers 114 and 114'. These positive pulses will cause the registers to shift up one state tending to cut off power to the motors 43 and 42 to decelerate same.

Similarly, the counterclockwise signal 211 from coordinate converter 110A controls the two counterclockwise rotating weights 34 and 31, ultimately controlling the lead or lag of such weights according to whether such weights lead or lag the vector sum of the counterclockwise vibration vectors.

While the vibrational forces from the rotor on the fuselage may be independent vertical and lateral forces, accelerometers 100 and 101, through the coordinate converter 110A and 110B, interpret such forces as components of counterrotating vectors in the vertical-lateral plane. An error in amplitude or phase of a clockwise-rotating weight vector from the force balancer 25, although causing motion in both the vertical and lateral directions, is sensed and correctly interpreted as an error in that clockwise channel only. An error in amplitude or phase of a counterclockwise weight vector from the force balancer 25, although causing motion in both the vertical and lateral directions, is also sensed and correctly interpreted as an error in the counter clockwise channel only. Therefore, the two-axis force balancer functions as two independent force-balancing systems, a counterclockwise and a clockwise force-balancing system.

The clockwise-rotating weights 33 and 32 are advanced or retarded by the outer loop 501 away from the vector sum of the rotating weight vectors and the rotating vibrational forces of the rotor. When this vector sum is substantially zero, the weights 33 and 32 are being rotated at the average rate of three times rotor speed controlled by the inner loop 500 and at an appropriate phase relation. In this phase relationship, the sum of the rotating weight vectors is directly opposite to and substantially balances or cancels out one component, in this case the clockwise component, of the vector sum of the vibrational forces in the vertical and lateral directions.

Similarly, weights 31 and 34 are advanced and retarded to shift the weights away from the vector sum of the rotating weight vectors and the rotating vibrational rotor forces. Again, these weights 31 and 34 are being rotated at the average rate of three times rotor speed and at an appropriate phase relation. In this phase relationship, the sum of the rotating weight vectors is also directly opposite to and balances or cancels out the other component, in this case the counterclockwise component, of the vector sum of the vibrational forces in the vertical and lateral directions.

Figure 6:
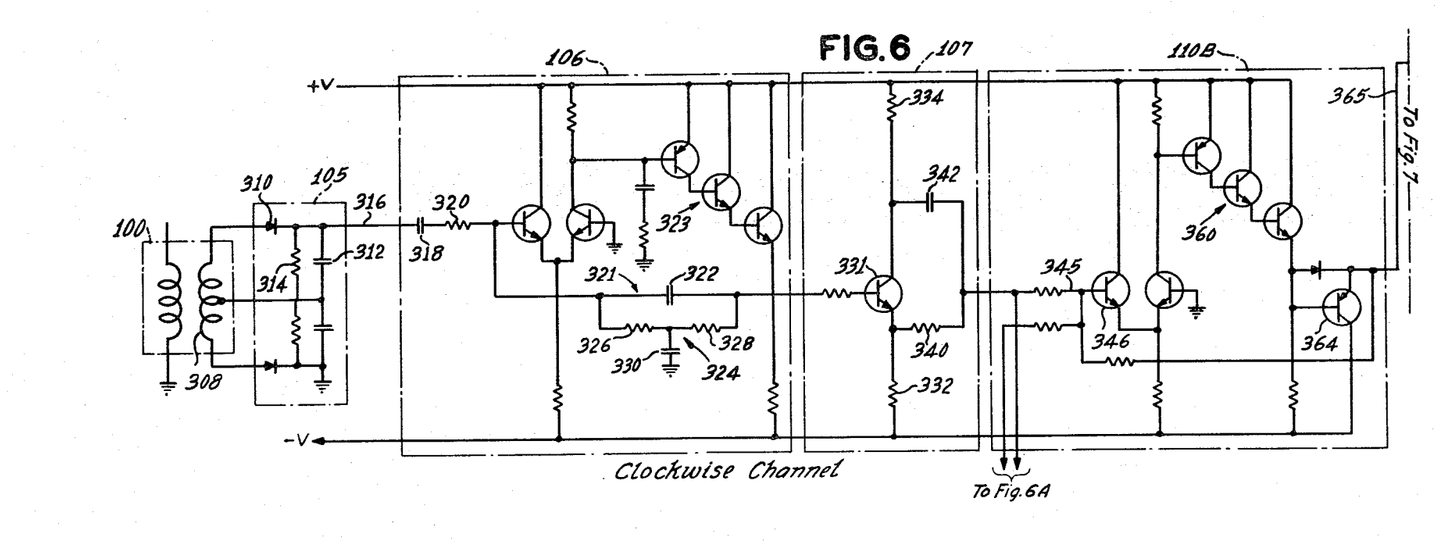
FIGS. 6, 6A and 7 are detail circuit diagrams of components of the control system.
Figure 6A:
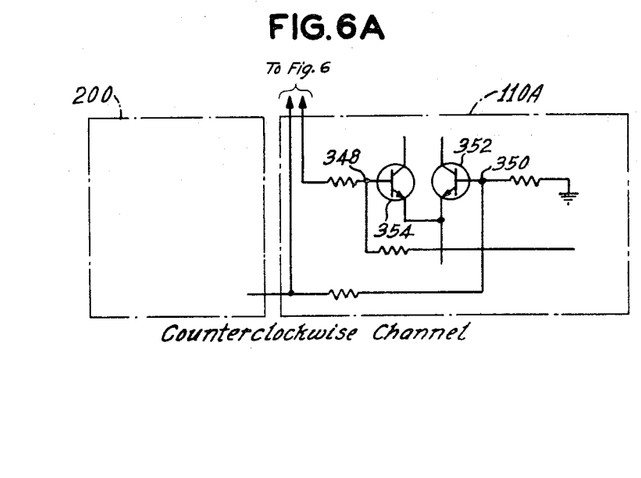

The circuitry of FIGS. 6 and 7 illustrates in detail the circuitry represented by the schematic block diagram of FIGS. 5A and 5B. As will be appreciated, a one- or single-axis system contains one circuit as shown in FIG. 6 and two of the circuits illustrated in FIG. 7 to the extent that only the pulse standardizer 142B of the pulse standard 131 is included. A two-axis system contains the substantial equivalent of two single-axis sytems.

In general, the circuits of FIGS. 6 and 7, when installed in a force balancer system, operate by the accelerometer signal being directly detected by demodulator 105. Each half of the accelerometer secondary winding 308 feeds a voltage to that portion of the demodulator 105 which includes a diode 310, a capacitor 312 and a resistor 314. Each capacitor 312 is charged through the corresponding diode 310 to the crest of the voltage coming from the corresponding secondary winding 308. When either secondary voltage is reduced or removed, the capacitors 312 are allowed to discharge through their corresponding resistors 314. When no acceleration signal is sensed by the accelerometer 100, the two capacitors 312 are equally charged in opposite directions. Accordingly, their voltages cancel at the output of the demodulator 105. When an acceleration is sensed, one voltage increases and the other decreases and the demodulator output is equal to their difference. Since only the alternating component of acceleration is of interest in the application of the invention, as described herein, a series capacitor 318, "washes out" any steady state voltage due to the earth's gravity or any unbalance in the demodulator 105 or the accelerometer 100.

The output 316 of the demodulator 105 is fed to the preamplifier filter 106 wherein the 3/rev. frequency is amplified and the other components of the signal are rejected. This amplifier 106 is a high-gain DC transistor amplifier connected as an operational amplifier. The input is through a resistor 320 and the feedback is through a notch filter 321 with the notch tuned to 3/rev. The notch is produced by feeding back two equal and approximately opposite currents to the input of the amplifier at the desired response frequency. These two currents are a leading current through a capacitor 322 connecting output with input and a lagging current produced by a resistor capacitor T-network 324 with series resistors 326 and 328 and a shunt capacitor 330.

Figure 10:
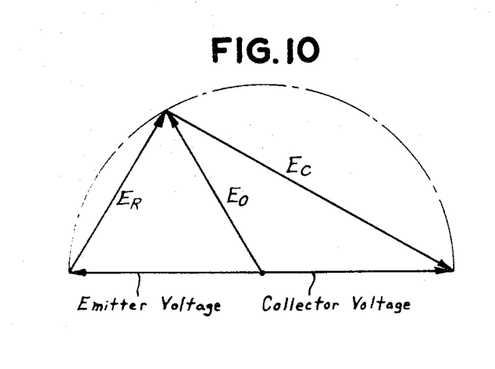
FIG. 10 is a vector diagram of the voltages in the phase adjuster portion of the control system.

The amplified and filtered signal from the operational amplifier 106 is the input to phase adjuster 107 which is a single transistor 331 connected as a phase splitter. In this circuit, the emitter and collector resistors 332 and 334 are made equal so that in carrying equal current they produce equal and opposite outputs, as illustrated in FIG. 10. The resistor 340 and capacitor 342 connected between the emitter and collector act as a voltage divider. However, the voltages across them are 90° apart, as shown in FIG. 10. The voltage at their junction, with respect to ground, is shown as the vector $E_o$ in FIG. 10 and may be varied in phase throughout a 180° sector. This may be achieved by changing the value of either the capacitor 342 or the resistor 340 so that their impedance ratio varies. The other 180° sector of phase may be obtained by reversing the accelerometer connection. It is thus possible to obtain any desired phase at the output of the phase adjuster 107 relative to the acceleration being sensed. In a two-axis system, the phase adjuster and 90°-phase lag circuit 200 may be identical to the phase adjuster 107, except for the phase shift which it is adjusted to produce.

The output of the phase adjuster 107 and the phase adjuster and 90°-phase lag 200 are summed in the coordinate converter 100B (FIG. 6) at the base 345 of the input transistor 346 for control of the clockwise weights 32 and 33. On the other hand, they are subtracted in coordinate converter 110A (FIG. 6A) for control of the counterclockwise weights 34 and 31. Subtraction of the signal is accomplished by applying one signal from accelerometer 100 to the input 348 used for summing and the other signal from accelerometer 101 to the base 350 of the other transistor 352 with which the input transistor 354 makes up a differential pair.

Coordinate converters 110A and 110B include DC amplifiers 360 similar to the amplifiers 323 of preamplifier filter 106, except for the lack of the notch filter 321 in the feedback network, and the addition of an added transistor 364. This transistor 364 is at the output for lowering the output impedance of the amplifiers 360 and drives the circuits which follow. Each coordinate converter amplifier 364 feeds two circuits of the nature shown in FIG. 7.

The phase demodulator 111 in FIG. 7 receives the signal through connection 365 from the coordinate converter 110B and chops it with a square wave derived from the weight pickoff 69. The pickoff voltage pulse is either positive or negative depending upon the slope of the magnetic insert which passes it. There are two magnetic inserts, including insert 66, which are diametrically displaced on the weight-carrying ring gear 38. The voltage produced in the inserts is amplified in the pulse standardizer 113 which also functions as a phase splitter or inverter. The two outputs 366 and 367 of the standardizer 113 feed a bistable symmetrical flip-flop 370 of the phase demodulator 111. The collector 372 of the flip-flop 370 drives a switching transistor 375 and shorts the signal to ground on alternate half-cycles of the square wave. At the instant of closing or opening of the switching transistor 375, the sudden change of voltage which occurs at the emitter 376 thereof is differentiated by the capacitors 380 and 392 to produce a sharp pulse. Depending upon its amplitude and polarity, the sharp pulse produced may move the tunnel diode register 114 one, two, or zero states. The number of states depends on the amplitude of the signal at the instant it is being chopped by switching transistor 375. The polarity of the pulse will depend on the polarity of the signal and whether the switching transistor 375 is opening or closing. Closing the switching transistor 375 on a signal produces a pulse of opposite polarity to the signal. Opening the switching transistor 375 produces a pulse of the same polarity.

Also feeding the tunnel diode register 114 are two other pulse sources which are similar to each other. One of the sources is derived from pulse standard 131 of speed reference generator 126 and the other from the motor electromagnetic pickoff 141, which feed pulse standardizers 142B and 142A, respectively. In both cases, the electromagnetic outputs from pickoffs 130 and 141 are amplified, squared, and differentiated. This produces positive and negative pulses at the outputs of the capacitors 382 and 384 which are at the output of the standardizers 142A and 142B. Shunt diodes 386 and 388 are employed at the outputs of these differentiating capacitors 382 and 384 to short out one polarity of signal in each case. This then leaves only negative pulses from the pulse standardizer 142B and speed reference generator channel and positive pulses from the pulse standardizer 142 and motor EM pickoff channel. The positive pulses move the diode register 114 up one state and the negative pulses move the register 114 down one state. Gearing involved is such that when the weight is synchronous with the 3/rev. vibration, the number of negative and positive pulses from these two sources is equal and they produce no net change in the register 114.

The tunnel diode register 114 includes four tunnel diodes 160, 161, 162, and 163 in series with a current source produced by a series resistor 391 from a regulated supply. Each of the tunnel diodes has two voltage states at the current supplied and the register 114 may have five states depending on whether 0, 1, 2, 3, or 4 of the diodes are at their high-voltage state. A small capacitor 392 is utilized to connect the various pulse sources at B with the register 114 and to pass the sharp leading edges thereof to command the register. Additionally, this capacitor 392 does not allow the pulse sources to draw any of the bias current away from the register 114 under steady state conditions. As shown in FIGS. 8 and 9, the motor 43 is supplied current when the register 114 is in either of its two lower states and is turned off in the other three states.

The register 114 controls the motor 43 through a DC amplifier 145, a pair of blocking oscillators 146, and a pair of SCR switches 147, which control a pair of bridge rectifiers 394. The DC amplifier 145 is biased so as to turn on the blocking oscillators 146 whenever the register 114 is in either of its two lower states. The blocking oscillators 146 in turn produce a series of pulses of sufficient output to trigger the SCR's 147 to which they are connected. In conjunction with the two bridge rectifiers 394, the SCR's 147 connect two of the three phases of the three-phase voltage source 178 to the motor 43 and thereby cause it to accelerate. The motor 43 will continue to accelerate until the register 114 remains above state 2 for a sufficient time to prevent firing of the two SCR's 147. The motor 43 will then decelerate due to the action of the eddy current brake 157. This off-on action occurs several times a second to keep the average speed of the weights synchronous with the 3/rev. vibration.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed is:

1. In a rotary wing aircraft, a vibration control system comprising a force-producing mechanism for substantially balancing out vibrations in one direction on the aircraft caused primarily by the rotating wing means, said mechanism including a first pair of weight means, a second pair of weight means, first asynchronous motor means for rotating one said weight means from each said pair in opposite directions at an average rotational angular velocity substantially equal to a constant ratio of the angular velocity of the rotating wing means, second asynchronous motor means for rotating the other said weight means from each said pair in opposite directions at an average rotational angular velocity substantially equal to a constant ratio of the angular velocity of the rotating wing means, a source of electrical power, and means for coupling and decoupling said source to each said first and second motor means thereby controlling the speed of each said asynchronous motor means to maintain said weights at said average rotational velocity.

2. In the rotary wing aircraft as defined in claim 1 wherein said first and second asynchronous motor means each include a pair of induction motors respectively rotating one of said means.

3. In the rotary wing aircraft as defined in claim 1 further comprising sensing means responsive to a change in amplitude or phase of the vibrations in the one direction caused by the rotating wing means, said sensing means controlling said means for coupling and decoupling of said source to said first and second asynchronous motor means thereby altering the speed of at least one said motor means which alters the angular position of said weight means.

4. In the rotary wing aircraft as defined in claim 1 further comprising means for sensing the vibrations on the aircraft in the one direction and producing an output vibration signal in response thereto, means for sensing the angular position of each said pairs of weight means and producing respective weight signals in response thereto, said means for coupling and decoupling including gating means between said source and respective said motor means responsive to respective said weight signals from said first and second pairs of weight means and said output vibration signal for coupling and decoupling respective said motor means to said source.

5. In the rotary wing aircraft as defined in claim 1 further comprising a standard means for producing a reference output signal; said means for coupling and decoupling including:
- a pair of sensing means for sensing the speed of respective said motor means and to produce signals responsive thereto;
- a pair of means each receiving said reference output signal and respective said motor signal from said pair of sensing means and producing a control signal; and
- a pair of gating means connected between said power supply and respective said motor means, each said gating means being responsive to respective said control signal to decouple said power supply from respective said motor means when said control signal includes a pulse of one characteristic and to couple said power supply to respective said motor means in response to said control signal when said control signal includes a pulse of another characteristic.

6. In the rotary wing aircraft as defined in claim 1 further comprising a speed reference generator for producing reference pulses having a first polarity and a given repetition rate, said means for coupling and decoupling including:
- a pair of sensing means for sensing the speed of respective said motor means and to produce motor pulses having a polarity opposite to said first polarity and a repetition rate which is a predetermined function of the speed of each said motor means;
- a pair of reversible register means each receiving said reference pulses and respective said motor pulses from said pair of sensing means, each said register means providing an output signal of a first characteristic when the number of said reference pulses exceeds the number of said motor pulses and of a second characteristic when the number of said motor pulses exceeds the number of said reference pulses; and
- a pair of gating means connected between said power supply and respective said motor means, each said gating means being responsive to said output signal from respective said register means of one said characteristic to decouple said power supply from respective said motor means and to couple said power supply to respective said motor means in response to said output signal from respective said register means of the other said characteristic.

7. In the rotary wing aircraft as defined in claim 6 wherein each said pair of reversible register means includes a plurality of serially connected tunnel diodes.

8. In the rotary wing aircraft as defined in claim 6 wherein each said reversible register means includes a plurality of serially connected tunnel diodes having different register states with said output signals of a first and second characteristic being provided at different register states, each said gating means including a blocking oscillator means biased for cutoff between one and another said register states, each said oscillator means responding to said output signal of one characteristic to actuate same, each said gating means further including switch means responsive to actuation of respective said oscillator means to couple respective said motor means to said power supply.

9. In a rotary wing aircraft, a vibration control system comprising a force-producing mechanism for substantially balancing out vibrations in one plane on the aircraft caused primarily by the rotating wing means, said mechanism including a first pair of weights, a first pair of electrical motors connected respectively to said weights of said first pair for rotating said weights in a clockwise direction at an average rotational angular velocity equal to a constant ratio of the angular velocity of the rotating wing means, a second pair of weights, a second pair of electrical motors connected respectively to said weights of said second pair for rotating said weights in a counterclockwise direction at an average rotational angular velocity equal to a constant ratio of the angular velocity of the rotating wing means, a source of electrical power means for sensing the vibrations in said plane and sensing the position of each said weight including;
- first means for sensing the vibrations on the aircraft in one direction in said plane and for producing a first output vibration signal in response thereto;
- second means for sensing the vibrations on the aircraft in another direction in said plane substantially perpendicular to said one direction and for producing a second output vibration signal in response thereto;
- means for combining said first and second output signals and for producing a clockwise control signal and a counterclockwise control signal; and
- means for sensing the angular position of each said weight and producing a weight signal in response thereto, means responsive to respective said weight signals from said first pair of weights for gating said clockwise control signal to couple and decouple said first pair of motors to said source and controlling the speed of said motors thereby altering the angular positions of said first pair of weights, and means responsive to respective said weight signals from said second pair of weights for gating said counterclockwise control signal to couple and decouple said second pair of motors to said source and controlling the speed of said motors thereby altering the angular positions of said second pair of weights.

10. In a rotary wing aircraft, a vibration control system comprising a force-producing mechanism attached to the aircraft for substantially balancing out vibrations in one plane on the aircraft caused primarily by the rotary wing means, said mechanism including a first pair of weights rotating in the clockwise direction and a second pair of weights rotating in the counterclockwise direction, first motor means connected to each of said first pair of weights for rotating said first pair of weights at an angular velocity equal to a constant ratio of the angular velocity of the rotary wing means, second motor means connected to each of said second pair of weights for rotating said second pair of weights at an angular velocity equal to a constant ratio of the angular velocity of the rotary wing means, the axes of rotation of said weights being substantially perpendicular to said one plane, means responsive to vibrations caused by the rotary wing means in a first direction in said one plane to produce an output signal proportional to the amplitude of the vibrations in said first direction, means responsive to vibrations caused by the rotary wing in a second direction in said one plane and substantially perpendicular to said first direction to produce an output signal proportional to the amplitude of the vibrations in said second direction, means for combining said output signals and producing a clockwise and counterclockwise signal, means responsive to said clockwise signal for controlling said first motor means to alter the position of each of said first pair of weights, and means responsive to said counterclockwise signal for controlling said second motor means to control the positions of each of said second pair of weights.

11. In a rotary wing aircraft, a vibration control system comprising a force-producing mechanism for substantially balancing out vibrations in one plane on the aircraft caused primarily by the rotating wing means said mechanism including a first pair of weights, a first pair of electrical motors connected respectively to said weights of said first pair for rotating said weights in a clockwise direction, a second pair of weights, a second pair of electrical motors connected respectively to said weights, of said second pair for rotating said weights in a counterclockwise direction, a power source for supplying power to each said motor, means for coupling and decoupling said motors from said power source to control the amplitude and phase of the centrifugal force produced by each said weight including:
- a speed reference generator for producing a speed reference signal proportional in frequency to the angular velocity of the rotating wing means;
- means for sensing the speed of each said motor and producing respective motor signals proportional in frequency to the angular velocity of respective said motor;
- first means for sensing the vibrations on the aircraft in one direction in said plane and for producing a first output vibration signal in response thereto;
- second means for sensing the vibrations on the aircraft in another direction in said plane substantially perpendicular to said one direction and for producing a second output vibration signal in response thereto;
- means for combining said first and second output signals and for producing a clockwise control signal and a counterclockwise control signal;
- means for sensing the angular position of each said weight and producing a weight signal in response thereto;
- means responsive to said weight signals from said first pair of weights for controlling the passage of said clockwise control signal;
- means responsive to said weight signals from said second pair of weights for controlling the passage of said counterclockwise control signal;
- first storage and gating means respectively connected between said power source and respective said first pair of motors for storing said clockwise control signal and respective said motor signal and said speed reference signal;
- first storage and gating means being operative to couple each said motor of said first pair to said power supply when appropriate signals are stored therein and to decouple each said motor when appropriate signals are not stored therein; and
- second storage and gating means respectively connected between said power source and respective said second pair of motors for storing said counterclockwise control signal and respective said motor signal and said speed reference signal; and
- said second storage and gating means being operative to couple each said motor of said second pair to said power supply when appropriate signals are stored therein and to decouple each said motor when appropriate signals are not stored therein.

12. In a rotary wing aircraft a vibration control system comprising a force-producing mechanism for balancing out the vector sum of the vibrations in one plane on the aircraft caused primarily by the rotary wing means wherein the vector sum is divided into a pair of vector components, said mechanism including a first pair of weights rotating in the clockwise direction and a second pair of weights rotating in the counterclockwise direction, a motor connected to each of said first pair of weights for rotating said first pair of weights in said clockwise direction at an angular velocity equal to the product of the angular velocity of the rotating wing and the number of rotor blades attached thereto, a motor connected to each of said second pair of weights for rotating said second pair of weights in said counterclockwise direction at an angular velocity equal to the product of the angular velocity of the rotary wing means and the number of rotor blades attached thereto, said axes of rotation of said weights being substantially perpendicular to said one plane, first means responsive to vibrations created by the rotary wing in a first direction in said one plane to produce a first output signal proportional to the amplitude of the vibrations in said first direction, second means responsive to vibrations created by the rotary wing means at said rotor hub in a second direction in said one plane and substantially perpendicular to said first direction to produce a second output signal proportional to the amplitude of the vibrations in said second direction, means for combining said first and second output signals and for producing a clockwise control signal and a counterclockwise control signal, means responsive to said clockwise control signal for controlling said motors rotating said first pair of weights thereby altering the positions of each of said first pair of weights to substantially balance out one component of the vector sum of the vibrations created by the rotary wing means and means responsive to said counterclockwise control signal for controlling said motors rotating said second pair of weights thereby altering the positions of each of said second pair of weights to substantially balance out the other component of the vector sum of the vibrations created by the rotary wing means.

13. In the rotary wing aircraft as defined in claim 12 further comprising a speed reference generator for producing a speed reference signal proportional in frequency to the angular velocity of the rotary wing means and means for sensing the speed of each said motor and producing respective motor signals proportional in frequency to the angular velocity of respective said motors, each said motor being controlled in speed by said speed reference signal and respective said motor signal to maintain the average angular velocity of respective said weight equal to the product of the angular velocity of the rotary wing means and the number of rotor blades attached thereto.

14. In the rotary wing aircraft as defined in claim 13 further comprising a standard means for producing a reference output signal; said means for coupling and decoupling including:
- a pair of sensing means for sensing the speed of respective said motor means and to produce signals responsive thereto;
- a pair of means each receiving said reference output signal and respective said motor signal, each said register means providing a control signal of a first characteristic and of a second characteristic; and
- a pair of gating means connected between said power supply and respective said motor means, each said gating means being responsive to respective said control signal of one said characteristic to decouple said power supply from respective said motor means and to couple said power supply to respective said motor means in response to said control signal of the other said characteristic.

15. In a rotary wing aircraft, a vibration control system comprising a force producing mechanism for substantially balancing out vibrations in one direction on the aircraft caused primarily by the rotating wing means, said mechanism including a first pair of weights, a second pair of weights, first motor means for rotating one said weight from said said pair in opposite directions at an average rotational angular velocity substantially equal to a constant ratio of the angular velocity of the rotating wing means, second motor means for rotating the other said weight from each said pair in opposite directions at an average rotational angular velocity substantially equal to a constant ratio of the angular velocity of the rotating wing means, the axes of rotation of all said weights being substantially perpendicular to said one direction, a source of electrical power, means for coupling and decoupling said source to each said first and second motor means thereby controlling the speed of each said motor means to maintain said weights at said average rotational velocity, sensing means responsive to a change in amplitude or phase of the vibrations caused by the rotating wing means for producing control signals, said means for coupling and decoupling being responsive to said control signals thereby altering the angular movement of each said weight to compensate for such change in amplitude or phase of the vibrations.

16. In the rotary wing aircraft as defined in claim 15 further comprising a speed reference generator for producing reference pulses having a first polarity and a given repetition rate, said means for coupling and decoupling including:
  a pair of sensing means for sensing the speed of respective said motor means and to produce motor pulses having a polarity opposite to said first polarity and a repetition rate which is a predetermined function of motor speed;
  a pair of reversible register means for receiving said reference pulses and respective said motor pulses, each said register means providing an output signal of a first characteristic when the number of said reference pulses exceeds the number of said motor pulses and of a second characteristic when the number of said motor pulses exceeds the number of said reference pulses; and
  a pair of gating means connected between said power supply and respective said motor means, each said gating means being responsive to said output signal from said register means of one said characteristic to decouple said power supply from respective said motor means and to couple said power supply to respective said motor means in response to said output signal from respective said register means of the other said characteristic.

* * * * *